United States Patent [19]

Schlafer

[11] Patent Number: 4,616,899
[45] Date of Patent: Oct. 14, 1986

[54] METHODS OF AND APPARATUS FOR COUPLING AN OPTOELECTRONIC COMPONENT TO AN OPTICAL FIBER

[75] Inventor: John D. Schlafer, Wayland, Mass.

[73] Assignee: GTE Laboratories Incorporated, Waltham, Mass.

[21] Appl. No.: 645,980

[22] Filed: Aug. 31, 1984

[51] Int. Cl.⁴ .............................................. G02B 6/32
[52] U.S. Cl. .................................................. 350/96.18
[58] Field of Search ............... 350/96.17, 96.18, 96.20, 350/96.15, 96.21

[56] References Cited

U.S. PATENT DOCUMENTS

| | | | |
|---|---|---|---|
| 4,290,667 | 9/1981 | Chown | 350/96.18 |
| 4,326,771 | 4/1982 | Henry et al. | 350/96.17 |
| 4,383,731 | 5/1983 | Simon et al. | 350/96.18 |
| 4,421,383 | 12/1983 | Carlsen | 350/96.18 |
| 4,531,810 | 7/1985 | Carlsen | 350/96.18 |

FOREIGN PATENT DOCUMENTS

| | | | |
|---|---|---|---|
| 2727177 | 12/1977 | Fed. Rep. of Germany | 350/96.18 |
| 2722367 | 12/1977 | Fed. Rep. of Germany | 350/96.18 |
| 56-60411 | 5/1981 | Japan | 350/96.17 |
| 1429843 | 3/1976 | United Kingdom | 350/96.18 |

OTHER PUBLICATIONS

Carlsen et al.; "Connectors That Stretch"; *Optical Spectra;* vol. 14, No. 10; Oct. 1980; pp. 41, 2.

*Primary Examiner*—William L. Sikes
*Assistant Examiner*—Robert E. Wise
*Attorney, Agent, or Firm*—Fred Fisher

[57] ABSTRACT

An optical fiber can be coupled to a semiconductor light source or detector using molded lens elements. The apparatus is easy to assemble, it is inexpensive, and it achieves true hermetic sealing of the semiconductor for a good reliability.

1 Claim, 3 Drawing Figures

METHODS OF AND APPARATUS FOR COUPLING AN OPTOELECTRONIC COMPONENT TO AN OPTICAL FIBER

BACKGROUND OF THE INVENTION

1. Field of the Invention

This invention relates to methods of and coupling an optoelectronic component to an optical fiber. Accordingly, it is a general object of this invention to provide new and improved methods of such character.

2. Description of the Prior Art

In the design of the commercial package for coupling an optical fiber to an optoelectronic component, such as a semiconductor light source or detector, consideration is given to mechanical, optical, electrical, and environmental factors. The need for accurate fiber alignment, efficient light transfer, good high frequency characteristics, and protection of the semiconductor from degradation due to moisture and contamination have resulted in rather complex and expensive packages for fiber coupled devices. Such packages in the prior art typically employ a number of custom made parts, use epoxy or other organic- based adhesives inside the package as a "hermetic" sealant, and require very tight part tolerances and/or involve alignment procedures to obtain good optical coupling efficiency.

3. Statement Pursuant to 37 CFR 1.56

Pursuant to 37 CFR 1.56 (a), the following reference is made of record: "Package Design for Miniature Link Components" by Cynthia P. Bloom and Douglas Krusithom, *Laser Focus,* Dec. 1982, p. 94. The reference relates to a fiberoptic component package providing the interface between an optical fiber and the active element in a transmitter or receiver. A precisely machined metal housing maintains the axial optical alignment of the emitter or detector and lens with the mating fiber and connector assembly.

This statement should not be construed as representation that a search has been made or that no other material information exists.

SUMMARY OF THE INVENTION

Other objects of this invention are to provide for new and improved methods of for coupling an optoelectronic component to an optical fiber in which: good optical coupling efficiency is achieved, alignment is easily obtained utilizing inexpensive components, and a true hermetic package is obtained.

In accordance with one aspect of the invention, a method of coupling an optoelectronic component to an optical fiber includes an assembly procedure. The optoelectronic component is affixed to a header. The component-affixed header is enclosed to maintain the component in a fixed environment while providing a window therewith for optically exposing the component. A first body of optical quality transparent plastic, having a reference surface and having a lens on its optical axis with a convex surface molded thereinto, recessed inward from the reference surface, is positioned with respect to the component so that the component is approximately one focal length away from the lens surface and approximately along the optical axis. Then, an alignment body of optical quality transparent plastic is positioned. The alignment body has an optical axis and has a reference surface. The alignment body has a lens on the optical axis thereof having a convex surface molded thereinto, recessed inward from the reference surface thereof. The alignment body further has a viewing plane surface perpendicular to the optical axis of the alignment body oriented approximately one focal length from the convex surface thereof. The viewing plane surface has an alignment mark centered on the optical axis of the alignment body and oriented one focal length from the convex lens surface thereof. The alignment body and the first body are positioned so that their reference surfaces engage each other and so that their optical axes are co-aligned. The first body is aligned with respect to the component so that the image of the component formed by the two lenses is focused on the center of the alignment mark. The aligned first body is affixed to the header. The alignment body is removed from the first body, and the optical fiber connector body is positioned, as described hereinafter. The optical fiber connector body is molded of optical quality transparent plastic having an optical axis and having a reference surface. The optical fiber connector body has a lens on the optical axis thereof having a convex surface molded thereinto, recessed inward from its reference surface. Means are provided for mating the optical fiber with the connector body along the optical axis thereof one focal length from the lens surface of the connector body. Therefore, the connector body and the first body can be oriented with their reference surfaces engaged with each other and their optical axes co-aligned.

BRIEF DESCRIPTION OF THE DRAWINGS

Other objects, advantages and features of this invention, together with its construction and mode of operation, will become more apparent from the following description, when read in conjunction with the accompanying drawings, in which.

DESCRIPTION OF PREFERRED EMBODIMENTS

The invention relates to methods of coupling an optoelectronic component to an optical fiber. As such, the optoelectronic component can be a semiconductor light source and, alternatively, it can be a light detector. The principles are equally applicable, whether the optoelectronic component is a semiconductor light source or a detector.

Figure 1:
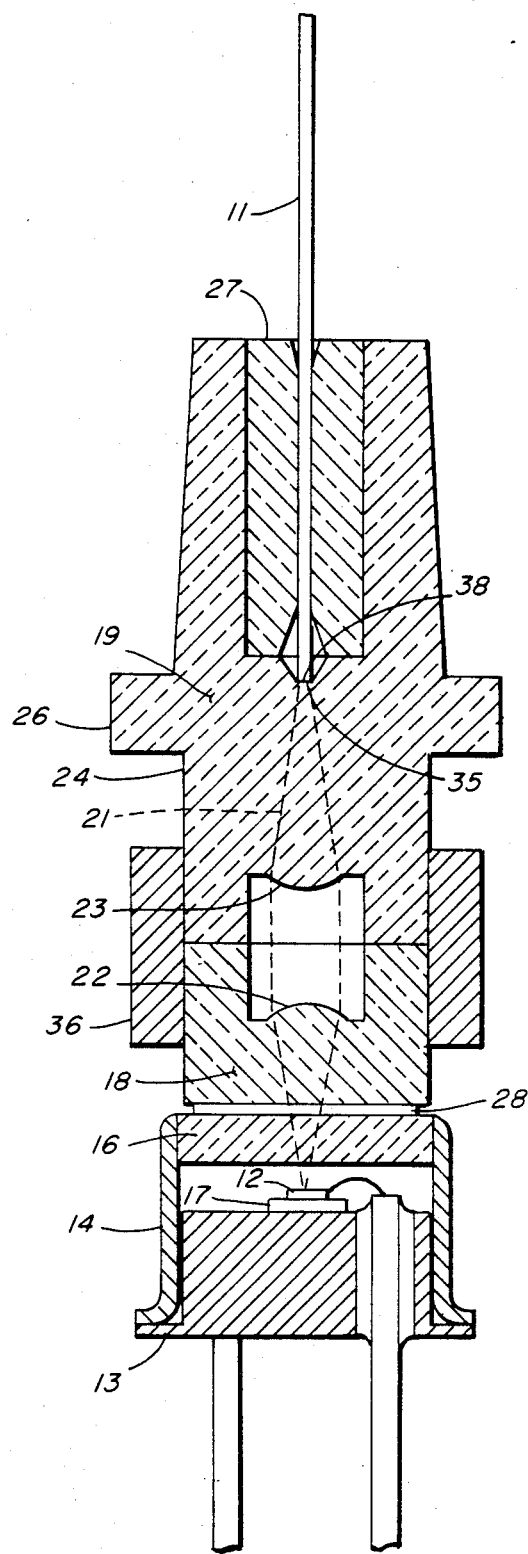
FIG. 1 is a view of one embodiment of the invention, depicting an optoelectronic component coupled to an optical fiber.

In this apparatus for coupling an optical fiber 11 to a semiconductor light source 12, a semiconductor chip 12 can be mounted in a standard commercial package, such as, for example, a TO-18 header 13, utilizing an enclosure 14 having a window 16, as depicted in FIG. 1. The semiconductor chip 12 can be mounted on a pedestal 17, if desired, to bring it closer to the window 16, depending on the style package chosen. Accuracy of the chip placement need only be ±0.01 inch, a value easily achieved using alignment marks. All mounting can be achieved with solder and the overall package can be hermetically sealed using standard flange welding equipment, with facilities for vacuum bake-out and sealing under inert atmosphere in accordance with techniques well known in the art.

Optical coupling of the semiconductor light source chip 12 to a fiber light guide 11 employs a set of lens parts 18, 19 mounted external to the hermetic package. Light rays 21 from the semiconductor light source 12 pass through the window 16 and are made parallel, or nearly parallel, by the package lens element 22. The rays 21 are then converged to pass into the end of the fiber 11 by the fiber termination lens element 23.

Through precision molding techniques, inexpensive lens elements 22, 23 can be formed that have excellent optical quality. The lens elements 22, 23 can be accurately aligned with an external guide 24 and a mounting flange 26, which incorporate a fiber alignment mechanism for accurate positioning of the end of the fiber 11 with respect to the lens element 23 focal point 38. These lens components can be similar to those described in U.S. Pat. No. 4,391,487. The fiber termination lens component 19 is commercially available in a molded plastic embodiment from GTE Fiber Optic Components Division in Williamsport, PA. The package lens part 18 can be made from the fiber termination lens part 19 by removing the flange 26 and fiber mounting sections 27 or by independently fabricating such part.

In lieu of utilizing a lens connector such as described in U.S. Pat. No. 4,391,487, as referred to hereinabove, an optical fiber connector such as that set forth in the Carlsen patent, U.S. Pat. No. 4,421,383 can be used.

Figure 2:
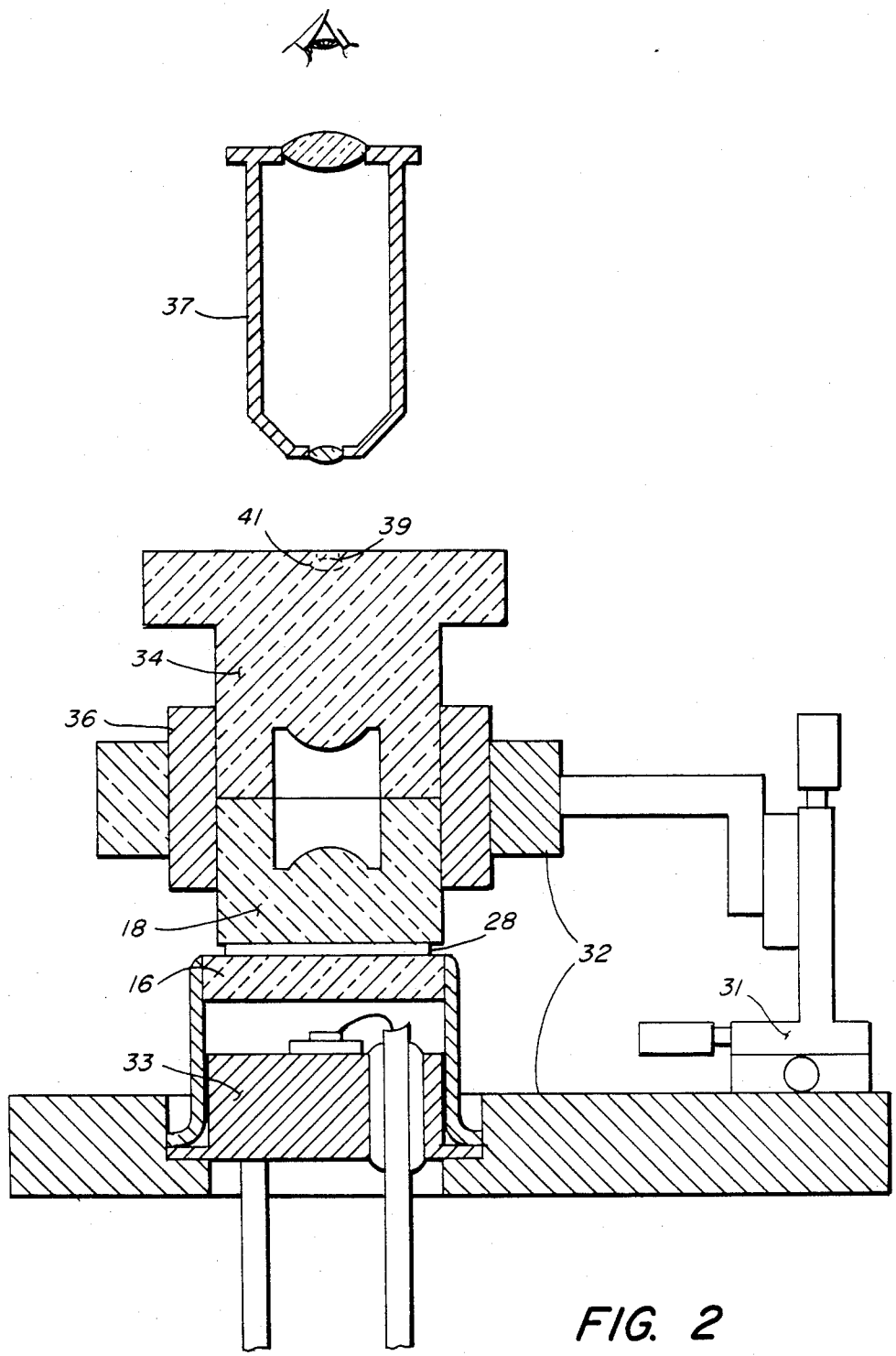
FIG. 2 is a view showing apparatus for aligning an optoelectronic component and coupling lens therefore for later coupling to an optical fiber.

A principal advantage of the coupling method as described herein is the ease with which the optoelectronic component and optical fiber can be assembled and aligned. As indicated hereinabove, a semiconductor light source can be assembled in a standard package using a commercial semiconductor packaging equipment and technique. The package lens component 18 can be attached to the window 16 using a rapid curing adhesive 28, such as an ultraviolet setting epoxy. Before such adhesive is set, the lens part 18 is aligned with the semiconductor light source 16 using a fixture, as shown in FIG. 2. The fixture includes a manipulator stage 31 having three axes of motion and a parts clamping stage 32 with which the package 33 can be moved relative to the package lens part 18. An alignment lens part 34 is coaxially coupled to the package lens part with a coupling ring 36 and a viewing microscope 37 for observing correct alignment. The alignment lens part 34 can be geometrically identical to the fiber termination lens part 19 except that the fiber termination section is removed at the lens focal point 38. A part of a small fiber alignment mark 39 is provided as an alignment mark. Alignment can be provided by viewing the alignment mark 39 with a microscope 37 and by moving the semiconductor light source package 33 with respect to the two lens parts 18 and 34 with the manipulator 31 until the image 41 of the light source emitting area formed by the two lens elements 22 and 23 is in focus and centered at the alignment mark 39. The adhesive 28, coupling the package 33 and the package lens part 18, is then cured, e.g., by using an ultraviolet lamp. The alignment lens part 34 is then removed and can be used to align subsequent packages.

An alternate alignment procedure can utilize a fiber terminated lens part 19 in lieu of the alignment lens part 34. The semiconductor light source 12 can then be energized to emit light and the package moved to maximize the amount of light coupled to the fiber 11, using a power monitoring instrument at the far end of the fiber 11.

As indicated hereinabove, the fiber coupling method can work equally well for coupling light from a fiber 11 to the sensitive area of a semiconductor detector 12, where the ray 21 paths, in such case, originate at the fiber end 35 and are then converged by the lens elements to the detector 12.

Figure 3:
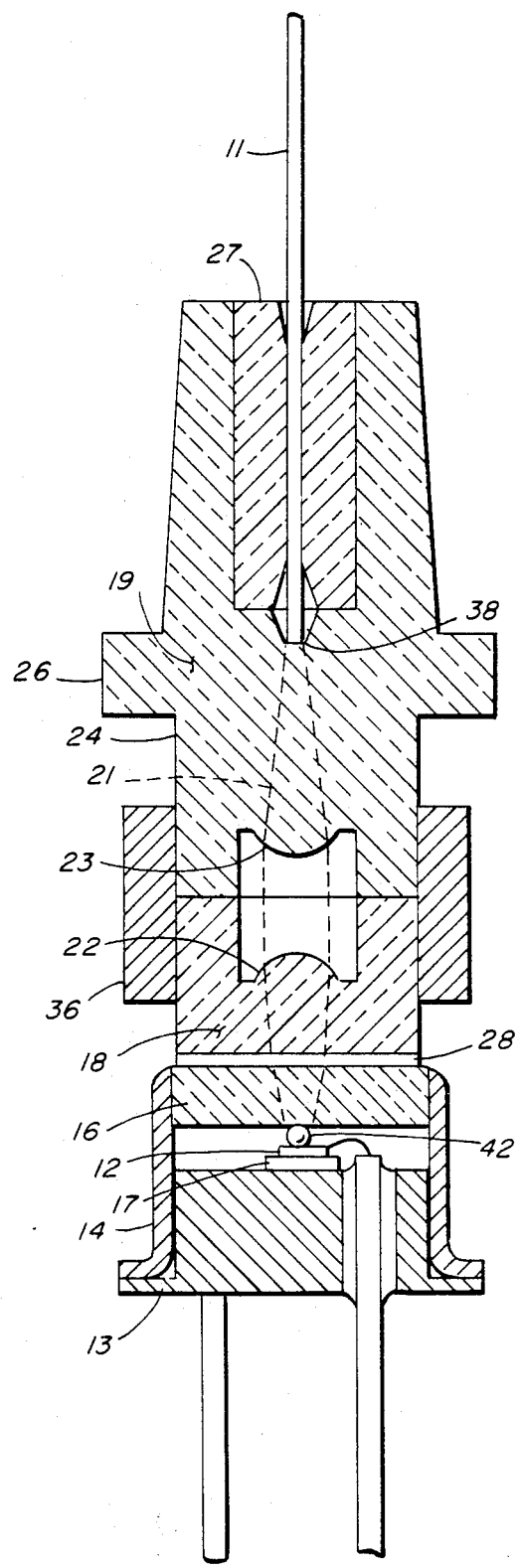
FIG. 3 is an embodiment similar to that of FIG. 1 further including an additional lens in proximity to the optoelectronic component.

As indicated in FIG. 3, a lens 42 can be incorporated inside the package to improve the coupling of the light source 12 to the fiber 11. This lens 42 acts to bend some of the transmitted rays 21 of the light so they make a smaller angle with respect to the axis of the fiber 11 causing more rays to be within the NA of the fiber 11. This is most effective when the emitting area of the light source 12 is smaller in diameter than the fiber core. Thus, the lens 42 would be arranged to form a magnified image of the emitting area equal in size to the fiber core and located near the focal point of the lens element in the package lens part 18. Such image is then relayed to the fiber 11 by the lens elements in the package lens part 18 and fiber termination lens part 19. Thus, while complicating the package in that an additional component is added, this internal lens 42 increases optical coupling efficiency between the light source 12 and the fiber 11 when the emitting area is smaller than the fiber core.

While the principal elements of this invention have been described, it is obvious that a commercial version thereof may require a housing for mechanical stability, ease of use, and for providing mounting surfaces and connecting threaded components. The design of such a housing can vary depending on the desired function, and such design is not critical to the coupling concepts described hereinabove.

In according with the teachings of this invention, it is noted that various advantages are provided thereby, e.g., the semiconductor chip can be sealed in a hermetic package with no organics in the package to produce contamination. Standard packaging parts and sealing equipment can be used for reduced cost. Optical parts with built-in alignment surfaces can be used for easy rapid assembly. Optical parts can be formed by molding for minimum cost. The package can be configured as a "fly lead" assembly, with a fiber termination lens part permanently attached to the package lens part, or as a connector assembly in which the fiber lens part may be demountably mated to the package lens part.

An alternative embodiment of this invention would use lens elements of a different style such as, for example, graded index rod lenses available under the trade name SELFOC from NSG America, Inc. These lenses exhibit the appropriate reference surfaces, similar to the lens elements described herein, which simplify assembly and alignment. Other similarly configured lens elements can also be employed within the scope and spirit of this invention.

What is claimed is:

1. A method of coupling an optoelectronic component to an optical fiber comprising
   (a) affixing said optoelectronic component to header;
   (b) enclosing said component affixed header, to maintain said component in a fixed environment, while providing a window therewith for optically exposing said component;
   (c) positioning a first body of optical quality transparent plastic having an optical axis and having
       (1) a reference surface, and (2) a lens on said optical axis having a convex surface molded into said body, recessed inward from said reference surface, said first body being positioned with respect to said component so that said component is approximately one focal length away from said lens surface and approximately along said optical axis, (d) positioning an alignment body of optical quality transparent plastic having an optical axis and having (1) a reference surface, (2) a lens on said optical axis of said alignment body having a convex surface molded into said alignment body, recessed inward from said reference surface of said alignment body, and (3) a viewing plane surface, perpendicular to said optical axis of said alignment body, oriented approximately one focal length from said convex surface of said alignment body, said viewing plane surface having an alignment mark centered on said optical axis of said alignment body and oriented one focal length from said convex lens surface of said alignment body, said alignment body and said first body being so positioned that their reference surfaces engage each other and so that their optical axes are co-aligned;

(e) aligning said first body with respect to said component so that an image of said component, formed by said lenses of said first body and said alignment body, is focused on the center of said alignment mark;

(f) affixing said aligned first body to said header;

(g) removing said alignment body from said first body; and (h) positioning an optical fiber connector body molded of optical quality transparent plastic having an optical axis and having (1) a reference surface, (2) a lens on said optical axis of said connector body having a convex surface molded into said connector body, recessed inward from said reference surface of said connector body, and (3) means for mating said optical fiber with said connector body along said optical axis thereof one focal length from said lens surface of said connector body;

so that said connector body and said first body are oriented with their reference surfaces engaged with each other, and with their optical axes co-aligned.

* * * * *